Patented Aug. 22, 1950

2,519,887

UNITED STATES PATENT OFFICE 2,519,887

METHOD OF PREPARING COAGULABLE LATEX

Francois Chassaing, Alfortville, France

No Drawing. Application February 18, 1948, Serial No. 9,318. In France May 10, 1939

Section 1, Public Law 690, August 8, 1946
Patent expires May 10, 1959

9 Claims. (Cl. 260—821)

My invention relates to a method of preparing latex which is made directly coagulable by heating it and to the product resulting therefrom, said product being adapted to be used to make moulded rubber articles.

According to my method, I add to latex a certain amount of an amyl ester of acetic acid, I let the mixture mature during the necessary time and in order to obtain the coagulation, I pour said mixture into a mould at a determined temperature.

According to a preferred embodiment of my invention, I add latex with isoamyl acetate, I stir the mixture, then I let it rest during four through ten days according to the type of latex whereupon the mixture is added with the usual vulcanizing agents and loading inert substances. Said mixture is then poured into a mould and heated to about 80° C.

The coagulation is then very quick and the stripped articles may be dried and vulcanized at once.

There are already known agents called sensitizers which, when added to latex, ensure its coagulation by heating but the compounds heretofore used for this purpose were metal salts such as ammonium nitrate so that after the coagulation the coagulum must be copiously washed during 48 hours in order to eliminate the salt, failing which a very alterable and hygroscopic rubber is produced.

Moreover a premature and accidental coagulation of the mixture has been sometimes observed and still more often it has been found that the coagulation was irregular and stratified.

By means of the method according to my invention these various disadvantages are overcome since the sensitizing ester is volatile and spontaneously eliminated during the drying of the coagulum.

Moreover the mixture of latex and ester is very stable and it may be stored at room temperature without any danger of premature coagulation.

Said mixture constitutes therefore a real new industrial product which may be steadily and accurately prepared in special works and becomes then available on the trade market ready to be used by the makers of moulded rubber articles. Said makers may then effect at any time the hot-moulding process without any preliminary admixture of any ingredient, which constitutes a considerable simplification over the actual method according to which the sensitizing agents must be incorporated just before using the product.

In addition to the advantages herebefore mentioned the method and product according to my invention have a further advantage according to which the drying time of the coagulum is far more reduced than in the case of the heretofore known methods. In which concerns relatively thick articles i. e. 10 through 15 mm., the drying time is reduced by 50% which allows for a considerable saving in the necessary equipment and fuel.

It has been found also that the completed articles had a more compact texture and therefore a better behaviour than with the usual methods. This feature may be explained as follows.

The sensitizers according to my invention and, particularly isoamyl acetate constitute rubber solvents; during the maturing of the mixture, the ester is absorbed by the suspended rubber particles which superficially swell and form an adhesive film so that during the coagulation said particles may intimately adhere one another.

While any type of latex may be used for the purpose of my invention, it is recommended to use so called deproteinated latex as the advantages proper to my invention and the well known qualities of this type of latex thus add to one another.

The following example illustrates a preferred composition:

| | Parts in weight |
|---|---|
| Latex at a 60% concentration stabilized with ammonia and deproteinated | 166 |
| Isoamyl acetate | 1 |
| Sulphur | 1 |
| Zinc oxyde | 1 |
| Antioxygen | 1 |
| Zinc phenyldithiocarbamate | 0.5 |

This mixture matures in ten days whereupon it remains stable during several months and may be so delivered to the trade. When it is heated at 80° C., it coagulates in a few minutes.

According to a preferred embodiment of my invention, the latex is added with rennet either before, or after mixing it with an amyl ester of acetic acid.

Adding latex with rennet results in a simplification of the preparation at a lower cost.

First of all, the presence of said rennet allows reducing in a considerable amount (about by three-quarters) the necessary ester. Also the rennet existing in the mixture allows shortening of the maturing time. Finally it renders the latex more responsive to heating and therefore more easily coagulable.

For example rennet having the following composition may be used:

| | Grams |
|---|---|
| Calf fourth stomach | 1000 |
| Sodium chloride | 50 |
| Water | 1000 |
| Ethyl alcohol | 100 |

The latex is added with this rennet at a rate of 5 through 20 g. of rennet per kilogramme of latex.

Thereafter the latex is added with isoamyl acetate or another amyl ester of acetic acid.

According to my invention the following composition may be used, inter alia:

| | Parts in weight |
|---|---|
| Latex in a 60% concentration stabilized with ammonia and deproteinated | 664 |
| Rennet | 6.5 |
| Isoamyl acetate | 1 |
| Sulphur | 4 |
| Zinc oxide | 4 |
| Antioxygen | 4 |
| Zinc phenyldithiocarbamate | 2 |

This mixture matures in two days; then it remains perfectly stable; it may be poured into moulds and heated to produce its coagulation.

I claim:

1. A method of preparing coagulable latex comprising adding a small quantity of an amyl ester of acetic acid to latex and aging the mixture.

2. A method of preparing coagulable latex comprising adding a small quantity of an isoamyl acetate to latex and aging the mixture.

3. A method of preparing coagulable latex comprising adding a small quantity of an amyl ester of acetic acid and several times as much rennet to latex and aging the mixture.

4. A coagulable latex comprising an aged mixture composed of latex and an amyl ester of acetic acid.

5. A method of preparing a heat coagulable latex solution comprising adding an appreciable quantity of an amyl ester of acetic acid to a latex solution in a proportion of less than 1% and aging the mixture.

6. A method of preparing a heat coagulable latex solution comprising adding an appreciable quantity of isoamyl acetate to a latex solution in a proportion of less than 1% and aging the mixture.

7. A method of preparing a heat coagulable latex solution comprising adding an appreciable quantity of an amyl ester of acetic acid to a latex solution in a proportion of less than 1% and a quantity of rennet ranging from ½ to 2%, and aging the mixture.

8. A coagulable latex solution comprising an aged reaction mixture of about 60% latex solution and an appreciable quantity of isoamyl acetate of less than 1% by weight.

9. A coagulable latex solution comprising an aged reaction mixture of about 60% latex solution, an appreciable quantity of isoamyl acetate of less than 1% by weight, and a quantity of rennet ranging from about ½ to 2%.

FRANCOIS CHASSAING.

REFERENCES CITED

The following references are of record in the file of this patent:

UNITED STATES PATENTS

| Number | Name | Date |
|---|---|---|
| 1,632,759 | Hopkinson et al. | June 14, 1927 |
| 1,996,090 | Willson | Apr. 2, 1935 |
| 2,311,488 | Thomas | Feb. 16, 1943 |

FOREIGN PATENTS

| Number | Country | Date |
|---|---|---|
| 859,335 | France | Dec. 16, 1940 |